United States Patent [19]

Ohno et al.

[11] 3,969,943

[45] July 20, 1976

[54] METHOD OF MEASURING THE TEMPERATURE OF FURNACE HOT STOCK AND APPARATUS THEREFOR

[75] Inventors: Jiro Ohno, Kawasaki; Tohru Iuchi, Tokyo; Yasuo Tokita, Kitakyushu; Hisanori Karasima, Kitakyushu; Kunitoshi Watanabe, Kitakyushu; Seiichhiro Murashima, Ikuhashi, all of Japan

[73] Assignee: Nippon Steel Corporation, Tokyo, Japan

[22] Filed: Mar. 6, 1974

[21] Appl. No.: 448,457

[52] U.S. Cl. .............................. 73/355 EM; 73/1 F; 73/355 R
[51] Int. Cl.² ........................................... G01J 5/06
[58] Field of Search .................... 73/355 EM, 355 R

[56] References Cited
UNITED STATES PATENTS

| | | | |
|---|---|---|---|
| 1,667,355 | 4/1928 | Norton | 73/355 R X |
| 2,275,265 | 3/1942 | Mead | 73/355 R X |
| 2,785,860 | 3/1957 | Harrison et al. | 73/355 R X |
| 3,039,308 | 6/1962 | Shiba | 73/355 EM X |
| 3,161,771 | 12/1964 | Engborg et al. | 73/355 R X |
| 3,277,715 | 10/1966 | Vanderschmidt | 73/355 R |
| 3,309,236 | 3/1967 | Gunji | 73/355 R X |
| 3,314,293 | 4/1967 | Schraeder | 73/355 R |
| 3,510,057 | 5/1970 | Werme | 73/355 R X |
| 3,529,473 | 9/1970 | Hager | 73/355 R |
| 3,537,314 | 11/1970 | Svet | 73/355 EM |
| 3,539,100 | 11/1970 | Scanlon et al. | 73/359 X |
| 3,559,726 | 2/1971 | Menasoff | 73/355 EM X |
| 3,610,592 | 10/1971 | Murray | 73/355 EM X |
| 3,696,678 | 8/1972 | Mossey | 73/355 R X |
| 3,766,781 | 10/1973 | Roberts | 73/355 R |
| 3,777,568 | 12/1973 | Riggin et al. | 73/355 EM |

*Primary Examiner*—Richard C. Queisser
*Assistant Examiner*—Frederick Shoon

[57] ABSTRACT

A method and an apparatus for measuring a heated material in an industrial furnace by the use of a radiation thermometer comprising providing a sliding means at the tip portion of the radiation thermometer, changing a distance between the heated material and the shielding means to determine background radiation rate of the energy reflected or emitted from the atmosphere of the furnace. The background radiation rate is determined by the output energy of the radiation thermometer, which together with an accurate temperature of the heated material and an ambient temperature of the furnace, are used to calculate a temperature error at arbitrary distances. Setting the shielding means of the radiation thermometer in a position at which the temperature error is within a tolerable range, and measuring the heated material with use of the radiation thermometer.

16 Claims, 30 Drawing Figures

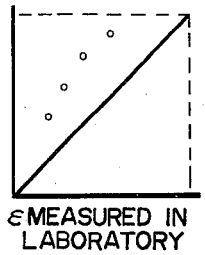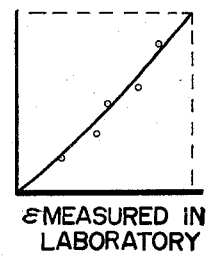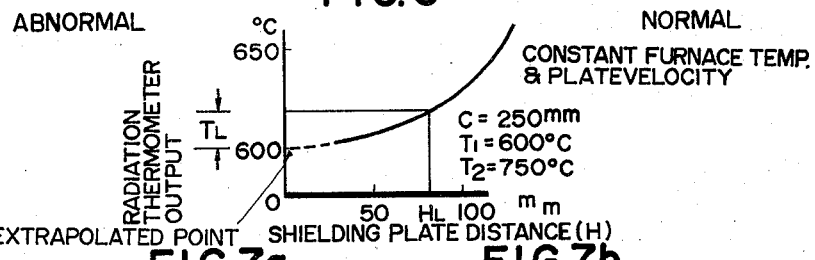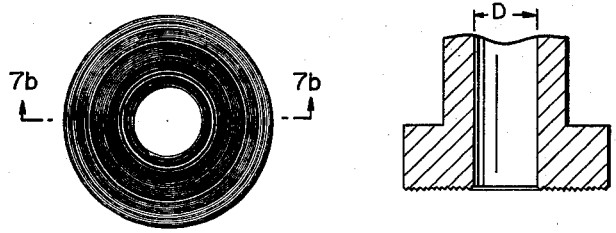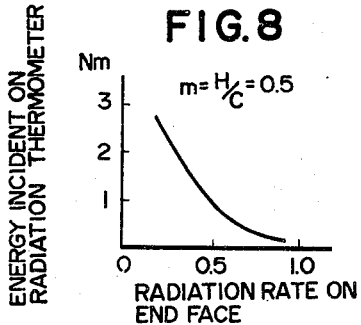

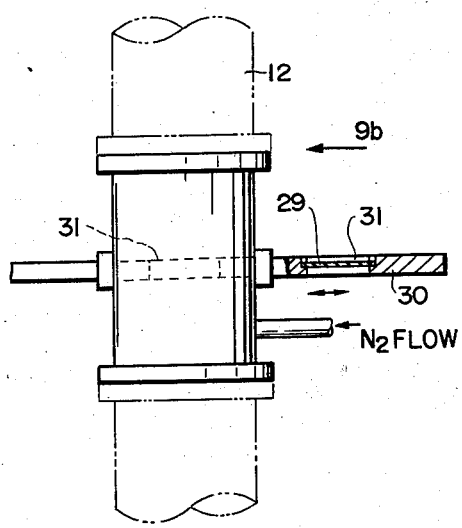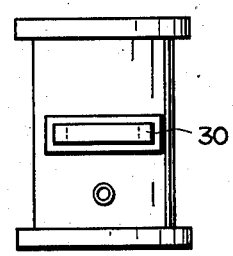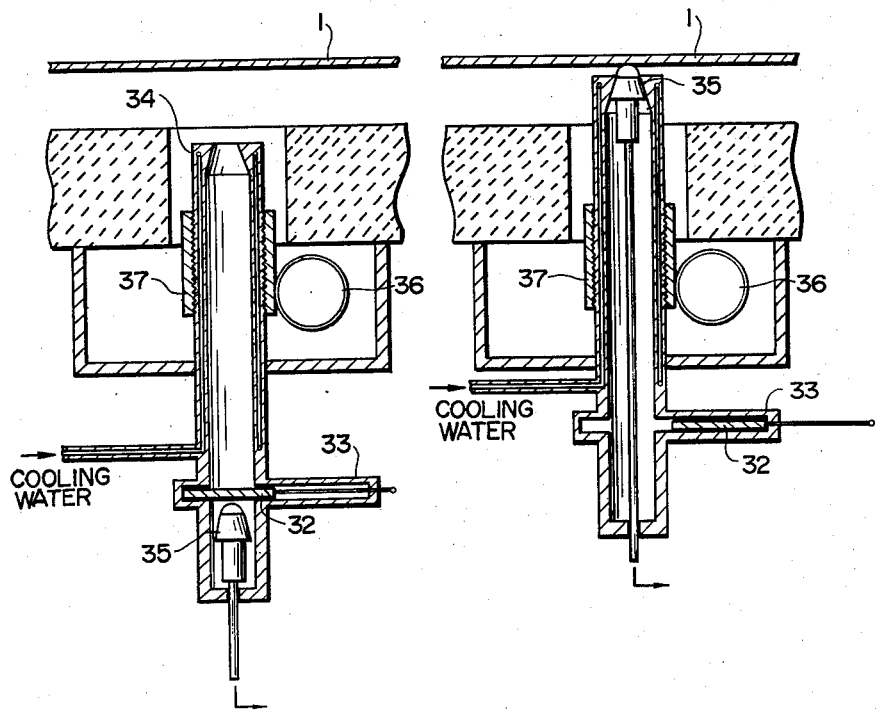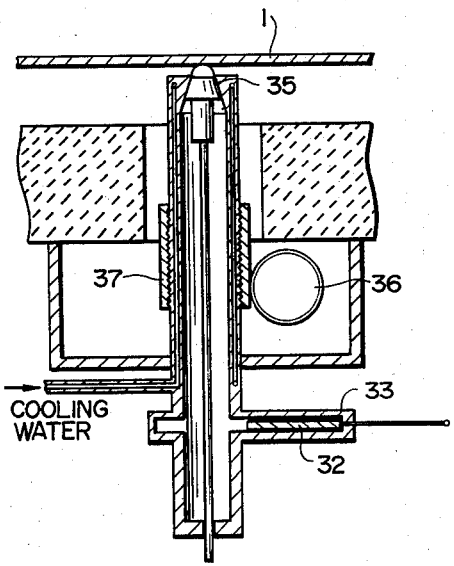

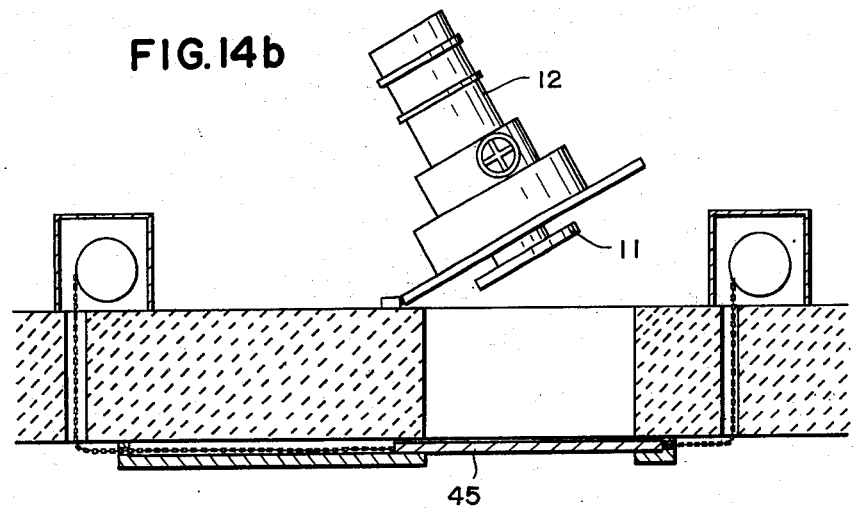
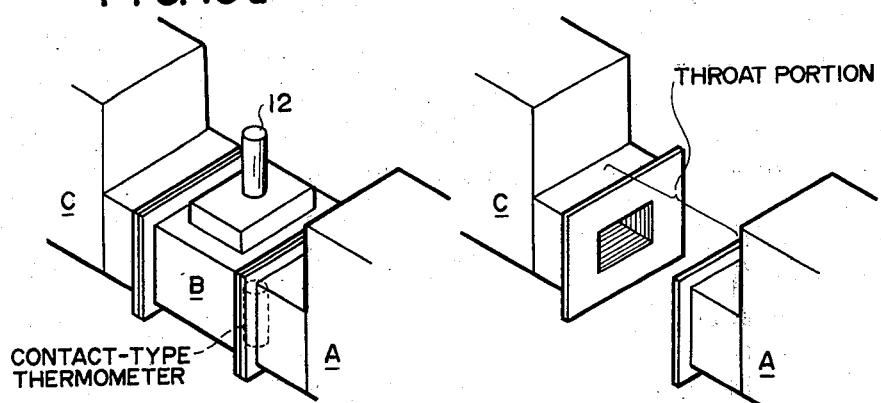
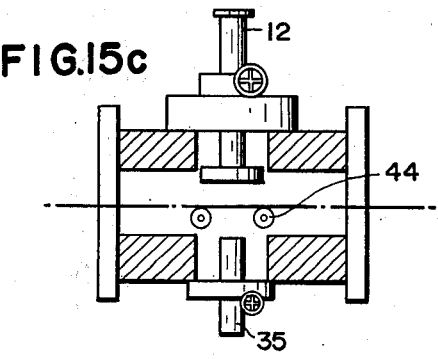

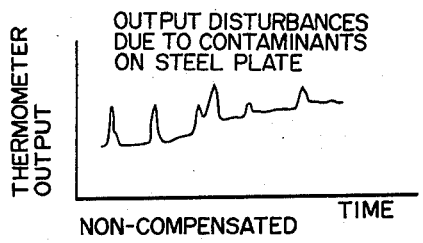
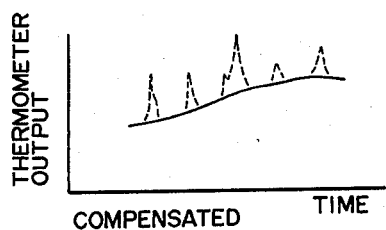
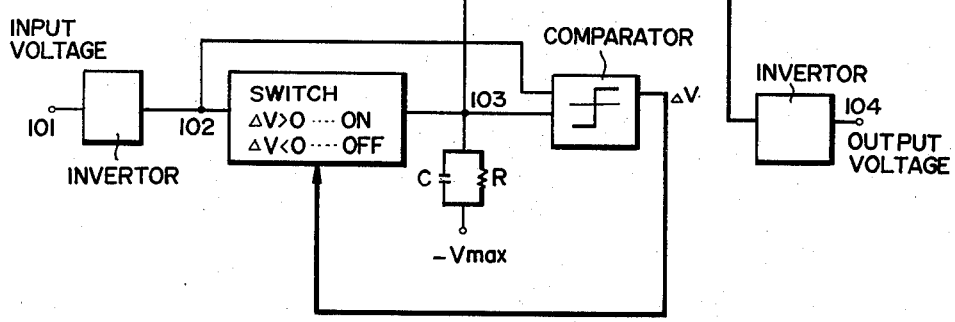
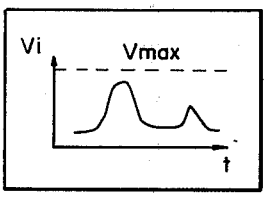
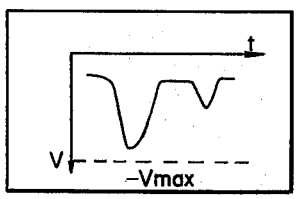
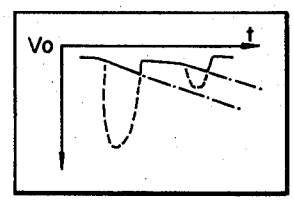
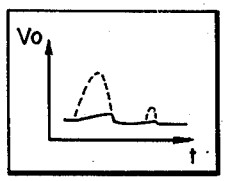
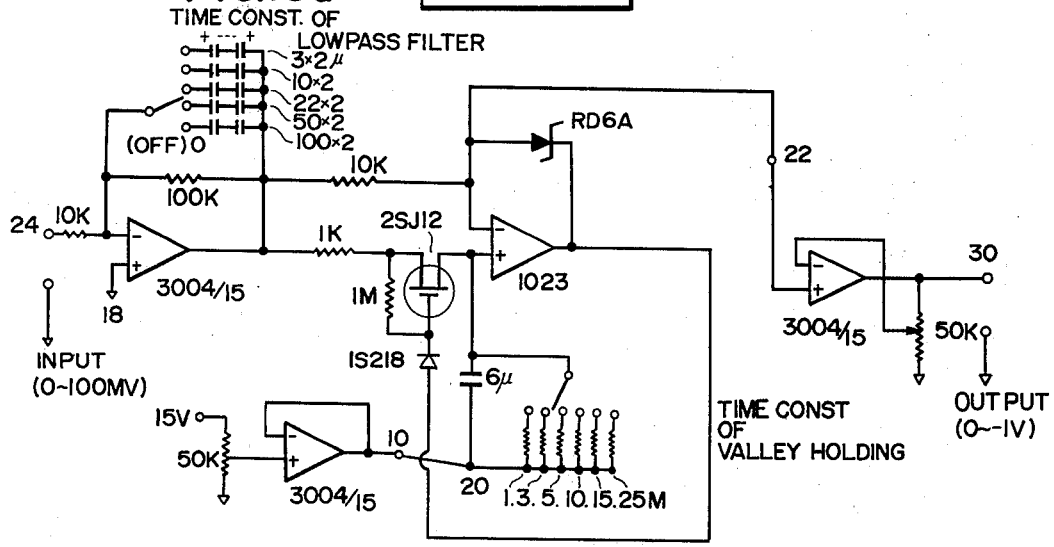

METHOD OF MEASURING THE TEMPERATURE OF FURNACE HOT STOCK AND APPARATUS THEREFOR

BACKGROUND OF THE INVENTION

This invention relates to a method and an apparatus for measuring temperatures of hot material including a heated steel plate in an industrial furnace such as a continuous annealing furnace.

Radiation pyrometers or therermometers have been heretofore employed for measuring the temperature of hot material which is heated in an industrial furnace of the above-mentioned type. However, the radiation pyrometer is not necessarily suited for the accurate measurement of temperature of a heated material in the furnace since the pyrometer is influenced by energy radiated from wall surfaces of the furnace. Accordingly, in actual operations, for example, in a steel plate annealing operation in a steel plant, which requires an accurate control of temperature of the heated material, various problems arise due to an inaccurate temperature measurement, adversely affecting the quality of the heated material and the controls of the subsequent treating steps.

Moreover, contact-type thermometers have been used for more accurate measurement of temperatures of heated material by direct contact with the material. However, the direct contact-type thermometer has a disadvantage in that, where a heated material is moved as in a continuous annealing furnace, the surface of the heated material may be damaged by direct contact with the thermometer, with increased abrasive wear of the thermometer itself. Thus, it is difficult to employ a contact type thermometer as well.

It is therefore desirable to measure the temperature of heated material in a non-contacting state, and in this sense, the above-mentioned radiation pyrometers or thermometers have thus far been resorted to. Preferably, the radiation thermometer should be located in a position as close to a heated material as possible so as to reduce a measuring error to a minimum. In actual operations, however, a heated material such as a steel plate is not necessarily flat and is often in a wavy form. A wavy heated material has possibility of colliding with and breaking down the radiation thermometer. In order to avoid this, it is necessary to keep the heated material spaced from the radiation thermometer. This invariably results in a measuring error due to the radiation energy from wall surfaces of the furnace.

SUMMARY OF THE INVENTION

The method of the present invention is directed to a method of accurate measurement of temperatures of a heated material in an industrial furnace of the type mentioned hereinbefore by the use of a radiation thermometer and particularly to accurate measurement of temperatures of a heated material with use of a shielding means, which is movable to occupy an optimum position for measurement, thereby shielding the thermometer from radiation energy, which is emitted from a hot object other than the heated material, including the furnace walls.

It is an object of the present invention to provide a method for substantially accurately measuring temperatures of heated material without contact by sensing means.

It is a further object of the present invention to provide a method for measuring a heated material temperature by means of a radiation thermometer set in a suitable position for holding errors within a tolerable range.

It is another object of the present invention to provide an apparatus for measuring temperatures of heated material without contact within a tolerable range of error.

Other and further objects and advantages of the present invention will become apparent from the following description.

In order to attain the above objects, there is provided a method particularly suitable for measuring temperatures of hot travelling material in an industrial furnace, by means of a radiation thermometer, said method comprising positioning a shielding means at a tip end of a radiation thermometer, changing the distance between the shielding means and the heated material to determine a rate of reflected energy which is incident from the atmosphere (hereinlater referred to as a back radiation rate), based on an output energy of the radiation thermometer, an accurate temperature of the heated material and an ambient temperature, determining with use of the back radiation rate a measured temperature error in relation to a given value of the above distance, setting the shielding means at a distance which holds a temperature error within a tolerable range for measuring the heated material.

After setting the radiation thermometer in position which holds a temperature error within an acceptable tolerance, the temperature of the heated material is accurately measured by the use of a contact-type thermometer. Then, the emissivity correction value $\epsilon_a$ of the heated material in an industrial furnace is determined by adjusting a reading on the radiation thermometer to the same value as that of the contact-type thermometer. More accurate measurement of the temperature can be attained by adjustment of an output energy of the radiation thermometer with use of the emissivity $\epsilon_a$.

The method and apparatus of the present invention will become clear from the following description in conjunction with the accompanying drawings.

BRIEF DESCRIPTION OF THE DRAWINGS

FIG. 5a is a graphical representation of an emissivity $\epsilon$, which is measured on a laboratory scale, and an emissivity $\epsilon$ which is measured in actual operation i.e. production line with use of a contact-type thermometer in an abnormal furnace atmosphere;

FIG. 5b is a graphical representation similar to FIG. 5a but showing the emissivity $\epsilon$ measured in a normal furnace atmosphere;

FIG. 6 is a graphical representation of a distance H between a shielding plate with a radiation thermometer and a heated material, in relation with an output value of the radiation thermometer;

FIG. 7a is a front view of a shielding means;

FIG. 7b is a sectional view, taken along the line 7b—7b of FIG. 7a;

FIG. 8 is a graphical representation of an emissivity at an end face of the shielding plate and an output energy of the radiation thermometer;

FIG. 9a is a front view of a filter unit of the radiation thermometer of the present invention;

FIG. 9b is a fragmentary view of the filter unit as seen from the direction 9b of FIG. 9a;

FIG. 10a is a sectional view illustrating a contact-type thermometer unit as not in use;

FIG. 10b is a view similar to FIG. 10a but showing the unit as in use;

FIG. 11b is a view sectioned along the line 11b—11b of FIG. 11a;

FIG. 14b is a view similar to FIG. 14a but showing the fixing means as not in use;

FIG. 15a is a schematical perspective view illustrating a throat portion of a continuous annealing furnace with a temperature measuring means according to the present invention;

FIG. 15b is a view similar to FIG. 15a but showing the temperature-measuring means as removed from the furnace;

FIG. 15c is a sectional view of the temperature-measuring means;

FIG. 16a is a graphical representation of an output energy of a radiation thermometer without an electrical compensating circuit in a furnace using a heating burner, in relation with time lapses;

FIG. 16b is a view similar to FIG. 16a but of an output of a radiation thermometer using an electrical compensating circuit;

FIG. 16c is a block diagram of an electrical compensating circuit with graphs showing waveforms of electric signals at different points of the circuit;

FIG. 16d is an electric circuit diagram particularly showing a compensating circuit;

DETAILED DESCRIPTION OF THE INVENTION

Figure 1:
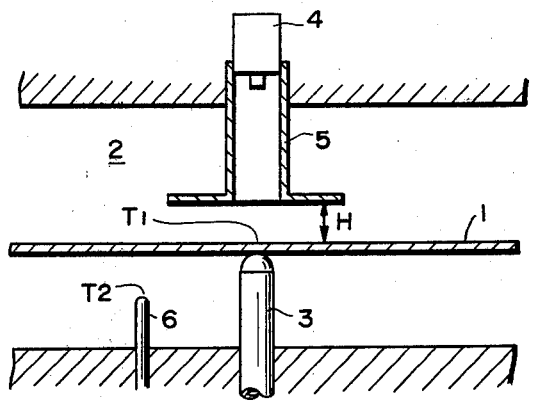
FIG. 1 is a schematical view showing a measuring apparatus of the invention.

Referring now to FIG. 1, indicated at 1 is a heated material or a steel plate, at 2 a throat portion of a continuous annealing furnace connecting heating, uniform-heating and cooling zones with one another, at 3 a contact-type thermometer, at 4 a radiation pyrometer or thermometer, at 5 a shielding means for the radiation thermometer, and at 6 a thermometer for measuring an ambient temperature.

Temperatures which are measured by means of a contact-type thermometer are generally proximal to the actual temperature, only with errors of substantially negligible degrees. In the present invention, measured temperature values which are very close to true temperatures will be hereinafter expressed as "accurate temperature". Such accurate temperature can be measured, without use of a contact-type thermometer, by the use of a furnace heating means of a particular nature by a method which will be illustrated in detail hereinlater. However, it is difficult to measure accurate temperature in a continuous manner and therefore, in the present invention, the measurement is carried out for a relatively short period of time.

In operation, an accurate temperature $T_1$ °C of a steel plate 1 which is positioned beneath the shielding means plate 1 is measured with use of the contact-type thermometer 3. Additionally, an ambient temperature $T_2$ which gives an influential effect on the measurement of the temperature $T_1$ is measured by means of the thermometer 6 such as a thermocouple or the like. In this connection, a normalized distance m between the steel plate and the shielding flange is expressed by the following equation (1)

$$m = H/C \qquad (1)$$

wherein $H = a$ distance between the steel plate 1 and the shielding flange, and $C = a$ radius of the shielding flange.

Then, the normalized distance m is varied to plot variations which occur in an output energy $E_m$ of the radiation thermometer. A back radiation rate $\eta$ which is defined by the following equation is calculated with use of the measured values $T_1$, $T_2$ and $E_m$ $$\eta = \frac{N_m}{N_\infty} = \frac{E_m - \epsilon K T_1^{n_1}}{E_\infty} \qquad (2)$$

wherein $\epsilon$ is an emissivity of the steel plate, K is a proportionality constant, $N_m$ is the back radiation noise, $N\infty$ is the back radiation noise measured without using the shield, $E_\infty$ is a value of an output energy of the radiation thermometer which is measured without use of a shielding means, and $n_1$ is an index expressed by $C_2/\lambda T_1$ in which $C_2$ is the second radiation constant of 14388 $\mu$K and $\lambda$ is an effective detecting wavelength of the radiation thermometer.

The energy value $E_\infty$ can be expressed by an equation $$E_\infty = E_b(T_2)$$

and is thus a value of an output energy of the radiation thermometer when measured at temperature $T_2$.

Furthermore, it is possible to use as an approximate factor for a value $\epsilon$ which is obtained by measurement on the outside of a furnace, the thus obtained value can be corrected in a manner as will be described hereinafter.

It will be apparent from the above that the rate $\eta$ is a ratio of a noise $N_m$ (hereinlater referred to as a back radiation noise) resulting from reflection of radiation from the ambient during measurement at a normalized distance $m$, to a back radiation noise $N\infty$ which is obtained by measurement under conditions using no shielding means.

Figure 2:
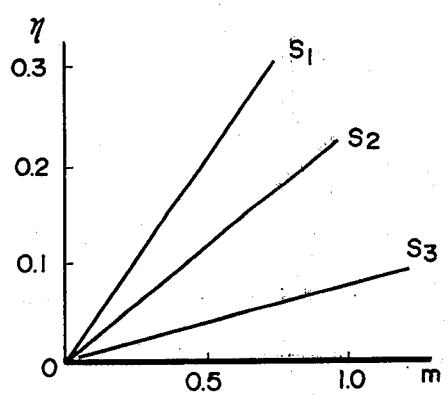
FIG. 2 is a graphical representation of a normalized distance m between a heated material and a shielding flange in relation with a back radiation rate $\eta$.

In FIG. 2, the relations of $\eta$ to the normalized distance $m$ are shown in connection with three different kinds (different carbon content) of steel plates $S_1$, $S_2$ and $S_3$. As will be apparent from FIG. 2, the value $\eta$ is linearly proportionally increased with an increase of m and is varied depending upon the kind of the steel plate.

When the value $\eta$ has been determined, the back radiation noise $N_m$ of the radiation thermometer which corresponds to variations in furnace temperatures can be calculated by the following equation (4)

$$N_m = \eta\, E_b(T_2) \qquad (4)$$

Figure 3:
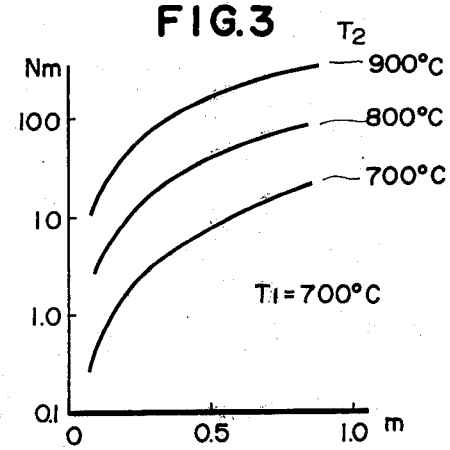
FIG. 3 is a graphical representation of the normalized distance m in relation with a back radiation noise $N_m$.

In FIG. 3, there is shown a typical graphical representation of the noise $N_m$ and the normalized distance m wherein the abscissa represents the normalized distance m and the ordinate the back radiation noise $N_m$ on a logarithmic scale.

Then, there can be calculated from the following equation (5) a temperature error caused by the back radiation noise $N_m$ which corresponds to an arbitrary normalized distance $m$ $$\frac{\Delta T}{T_1} = (1 + \frac{N_m}{\epsilon E_b(T_1)}) \lambda T_1/C_2 \qquad (5)$$

wherein $\Delta T$ = Apparent temperature of radiation thermometer — True

TEMPERATURE

Figure 4:
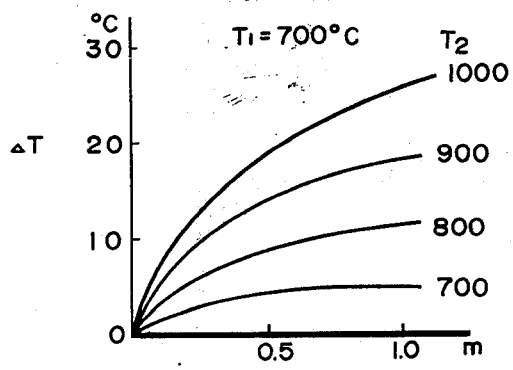
FIG. 4 is a graphical representation of the normalized distance m in relation with a measured temperature error $\Delta T$.

A typical example of relations between the temperature error $\Delta T$ and the normalized distance $m$ at different temperatures $T_2$ is shown in FIG. 4. The distance $m$ can be determined within a tolerable temperature error range, by the equation (5) or FIG. 4 and thus the shielding means 5 may be set at an optimum distance $m$.

Thereafter, a temperature of the steel plate or a heated material is measured by means of a contact-type thermometer to correct an emissivity in such a manner that the radiation thermometer indicates an accurate temperature of the steel plate.

When the emissivity correction value is expressed in terms of $\epsilon_a$, the value $\epsilon_a$ can be represented by the following equation (6)

$$\epsilon a = K(\epsilon + \eta\, \frac{T_2{}^{n_2}}{T_1{}^{n_1}}) \qquad (6)$$

wherein K is a transmission rate of a filter and $n_1$ and $n_2$ are indexes expressed by $C_2/\lambda T_1$ and $C_2/\lambda T_2$, respectively. The correction value $\epsilon_a$ is different from a true emissivity $\epsilon$ of the steel plate since the correction value obtained is affected by various factors including the back radiation noise $N_m$, the temperature absorption by a furnace gas, a transmission rate of a transmission layer, and the like. The output energy of the radiation temperature is corrected with use of the correction value $\epsilon_a$. In doing so, a temperature can be accurately measured by means of a radiation thermometer without physical contact.

In addition to the above-mentioned methods for setting the shielding means in position and for calibrating the output indication of the radiation thermometer, another calibrating method of the radiation thermometer will be discussed hereinbelow.

That is, a steel plate is cut into measuring sample plates prior to insertion into an industrial furnace. The sample plates are then heated and cooled in an experimental furnace capable of producing the same ambient conditions and heating and cooling cycles as in the actual furnace i.e. industrial furnace, for simulating the thermal treatment of the sample plates at an actual temperature measuring point on a laboratory scale to measure an emissivity of the sample plates. The measured emissivity is used as an emissivity correction value for the radiation thermometer. In this case, the measurement can be carried out by means of a simplified measurement device without use of a contact-type thermometer. However, where the steel plate undergoes changes in shape during thermal treatments, it is generally difficult in a laboratory experiment to treat the sample plate by allowing the surfaces of the plate to be treated in the same manner as in an actual furnace. In this connection, an on-line steel plate temperature is first measured by the use of a contact-type thermometer. Then, a calibration of the radiation thermometer is carried out in such a manner that a reading on a radiation thermometer becomes the same as that of the contact-type thermometer, thereby determining an emissivity correction value $\epsilon_a$. Meanwhile, a value of an emissivity which is measured in a laboratory in the same procedure as described hereinbefore is substituted in the equation (6) to determine an emissivity correction value $\epsilon'_a$. When the value $\epsilon_a$ is equal to the value $\epsilon'_a$, the emissivity correction value is adopted as a correct value. In case where the values are unequal to each other, the measuring procedure using a contact-type thermometer should be checked, particularly with regard to whether or not the thermometer is contacted with a material to be measured in a proper state or with a reducing atmosphere furnace, and whether or not surfaces of a steel plate are oxidized with changes in an emissivity due to admixture of an oxidative gas in the furnace. That is, the temperature of a heated material must be measured in a normal state. The relation of emissivity values, which are measured with use of a contact-type thermometer in an actual furnace, and those which are measured in a laboratory furnace are shown in FIGS. 5a and 5b, (abscissas and ordinates respectively) with a furnace gas admixed with or not admixed with an oxidative gas. As will be apparent from FIGS. 5a and 5b, the existence of an oxidative gas in the furnace contributes to increase the error in the output value of the radiation thermometer. Accordingly, it is necessary to inspect whether or not the atmosphere of a furnace includes an oxidative gas and to maintain the atmosphere in a non-oxidizing state if an oxidative gas exists in the furnace.

In case where no control of an atmosphere in the furnace is feasible, the emissivity $\epsilon$ should be corrected based on a calibration curve as shown in FIG. 5a.

In order to determine the positions of a shielding flange and a radiation thermometer in a continuous annealing furnace at the outlet of the uniform-heat zone where a furnace temperature becomes relatively uniform, the following simplified procedure may be used. A steel plate is passed through the uniform-heat zone at a relatively low velocity so as to measure the furnace temperature accurately, to heat the steel plate to a temperature equal to the furnace temperature and to make minimum the furnace temperature drop at the throat portion while maintaining the furnace temperature as uniform as possible. Under these conditions, when the distance H between a shielding flange and a heated material is varied, the relation between the distance H and the output of the radiation thermometer becomes as plotted in FIG. 6. Gradual decreases of the distance H result in corresponding reductions in the radiation thermometer output. From the curve of FIG. 6, the radiation thermometer output at $H = O$ can be obtained by an extrapolation procedure and an optimum distance $H_L$ of the shielding flange from a heated material is determined with use of the curve of FIG. 6, i.e., a line for a tolerable error temperature $\Delta T_L$ is drawn parallel to the abscissa to read out the corresponding distance $H_L$ on the the abscissa at a point corresponding to the point where the parallel line intersects the curve. The thus obtained distance $H_L$ is a shielding flange-setting distance. The curve of FIG. 6 should be determined in consideration of all operational conditions and the kinds of steel plates to be used. Then, the radiation thermometer output value is corrected with regard to the emissivity to coincide with the furnace temperature. In this connection, emissivity correction values for a typical steel at different treating temperatures will be discussed hereinlater.

The shielding flange is perferably made of a stainless steel plate and the bottom face of the flange facing the steel plate under measurement is formed with concentric grooves as shown in FIG. 7. The shielding flange is preferably oxidized in an oxidative atmosphere at 700°C or more to produce irregularities on the faces of the flange by oxidation. These surface irregularities contribute to improving the emissivity or absorption rate of the shielding flange. The face thus treated has an emissivity or an absorption rate of greater than 0.9, which is a value sufficient to enhance the shielding efficiency. In FIG. 8, there is shown a relation between a face emissivity and an energy which enters the radiation thermometer.

The radius of the aperture of the shielding flange is determined on the basis of a measurement field of view (a focal length) of the radiation thermometer used. That is, where a radiation thermometer which is attached to an end portion of a shielding mechanism has a radius $r$ of measurement field at an aperture having a radius D, it is required to satisfy the condition of $D/r < 3$ so as to ensure easy setting of the radiation thermometer and a satisfactory shielding effect.

The shielding flange is required to be cooled by water, so that, when the shielding flange is located closely to the steel plate, the latter is also cooled, producing an error in the measured temperature and an adverse effect on the steel material per se. Additionally, positioning of the shielding flange in an extreme proximity to the steel may result in undesirable contact therebetween in actual operation. However, the provision of the shielding flange at a distance far from the travelling steel plate is disadvantageous from a viewpoint of structural design of the furnace and becomes meaningless in view incapability of shielding the radiation.

Our experiments revealed that when the distance between the shielding flange and the steel was determined within the following range, the above disadvantages were completely removed. That is, when a radius of the shielding flange is expressed in terms of C and the distance between the steel plate and the shielding flange in terms of H, a ratio H/C is preferred to be within a range of 0.05 – 5. The distance may be varied depending upon the particular structure of the furnace and operational conditions. Additionally, in order to set the shielding flange in an optimum position or in a position apart from the steel plate as far as possible but within a tolerable error range, it is essentially required to move up and down the shielding flange preferably in an easy manner, i.e., by providing a moving mechanism for the shielding flange. Furthermore, the moving mechanism for the shielding flange is also required in abnormal operations involving steel breakage or the like where the shielding flange has to be held at a distance as far from the steel plate as possible.

The shield adjusting mechanism preferably has at its tip portion optical filter 29 for shielding an atmosphere gas in the furnace and for protecting the radiation thermometer. When contaminated, the filter 29 is removed and replaced by a fresh one or cleaned. In this connection, the replacement of the filter 29 should be effected in an easy manner without affecting other parts of the apparatus. FIGS. 9a and 9b show a filter unit useful in the present invention, in which the filter unit comprises a slide plate 30 for completely shutting out an inner atmosphere gas and capable of easily sliding in a horizontal direction. The slide plate 30 includes two spaced small apertures or openings 31 for mounting filters, one of which is used in actual operations and the other is used only for preparatory purposes. Either one of the filters may be replaced merely by sliding the slide plate 30 in a horizontal direction. In FIG 9a, the radiation thermometer is indicated at 12.

FIGS. 10a and 10b show a structure of a contact-type thermometer. As shown in FIG. 10a a detecting element 35 of the contact-type thermometer is kept in a casing 33 when not in use, and is safeguarded from an atmosphere of the furnace by closing the casing with a damper 32. A supporting tube 34 which is cooled with water is pulled down so as not to cause any operational troubles. When employing the contact-type thermometer, the damper 32 is first opened, as shown in FIG. 10b, and the element 35 is pushed up to the tip end portion of the supporting tube 34. When it is recognized that the element is fixed in position, the support tube 34 is transferred upwards by means of a pinion 36 and a rack 37 for upwardly moving the element 35 until the element 35 is contacted with a steel plate 1 while observing the contacting state through a viewing window.

Figure 11A:
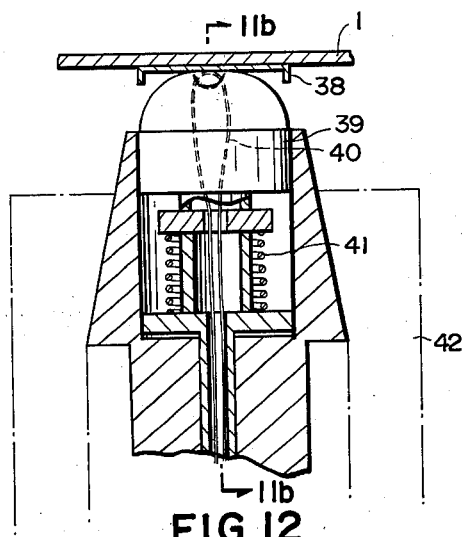
FIG. 11a is a sectional view illustrating a detector of the contact-type thermometer.
Figure 11B:
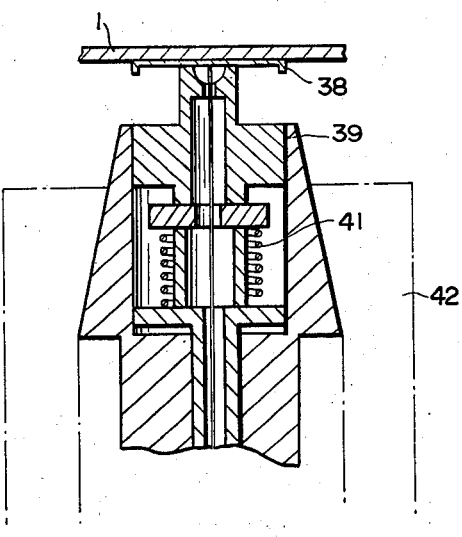

The element 35 has a spring 41, as shown in FIGS. 11a 11b, for suitably controlling the contact pressure of the elements 35 on the steel plate, following vertical movements of the steel plate, thereby to measure the temperature of the steel plate accurately. The element 35 may include a thermocouple 40, which is attached to a back surface of a guard sheet 38, for detecting the steel plate temperature. The thermocouple 40 is not directly contacted with the steel plate, and is thermally insulated by means of an insulating material 39 so as to accurately detect the steel plate temperature. The plate temperature can be measured within an error of $\pm 5°C$ in the vicinity of 800°C when using the element 35 of FIGS. 11a and 11b.

Figure 12:
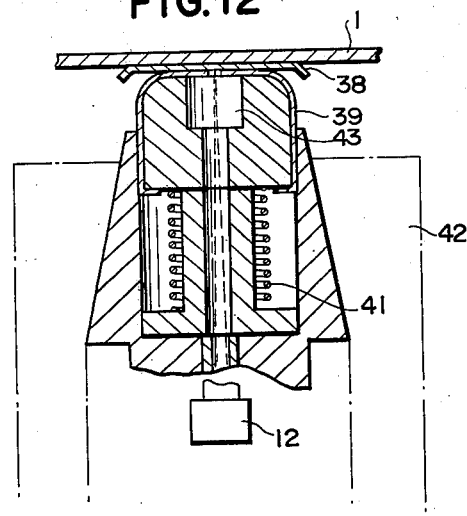
FIG. 12 is a partially sectional view illustrating another embodiment of a contact-type thermometer unit using a radiation thermometer as a temperature-detecting means.

FIG. 12 shows a temperature detecting means using a radiation thermometer instead of the contact-type thermometer as described hereinbefore.

In FIG. 12, similar parts are indicated by similar reference numerals. The radiation thermometer can accurately measure the temperature of the guard sheet 38 which is heated up to a temperature of a heated steel plate. Furthermore, the protecting plate has an oxidized surface with a high emissivity, so that it is possible to measure the temperature of the steel plate in an accurate manner. In FIG. 12 indicated at 43 is a cavity which is a passage for the radiation and is intended to correct the emissivity of the guard sheet 38 to about 1.0. The heat radiation from guard sheet 38 reaches to thermometer 12' through the opening of the insulating material 39 and the cavity 43. Thermometer 12' is a radiation thermometer and is employed instead of the contact-type thermometer 3 of FIG. 1.

When the steel plate travels with violent vibrations or in a wavy manner, many problems arise during the temperature measurement. For example, atmospheric noises increase to produce larger temperature-measuring errors and an unstable contact of the contact-type thermometer with the wavy steel plate may make the temperature measurement impossible to be carried out.

Figure 13:
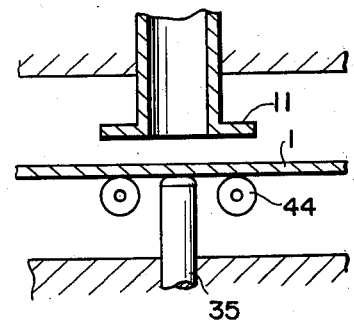
FIG. 13 is a fragmentary sectional view illustrating construction of another embodiment of the measuring apparatus of the present invention.

In order to avoid this, the temperature-measuring apparatus of the present invention includes supporting rolls 44, as shown in FIG. 13, by which the vibrations of the steel plate are prevented and the plate is maintained in a horizontal running position. Accordingly, it becomes possible to measure a steel plate temperature precisely. The supporting rolls 44 are perferably provided below the shielding flange. The shielding mechanism has preferably a construction which is easily attachable or detachable from a furnace wall without giving almost any adverse effects on the furnace atmosphere during operation. The attaching and detaching mechanism is shown in FIGS. 14a and 14b.

Figure 14A:
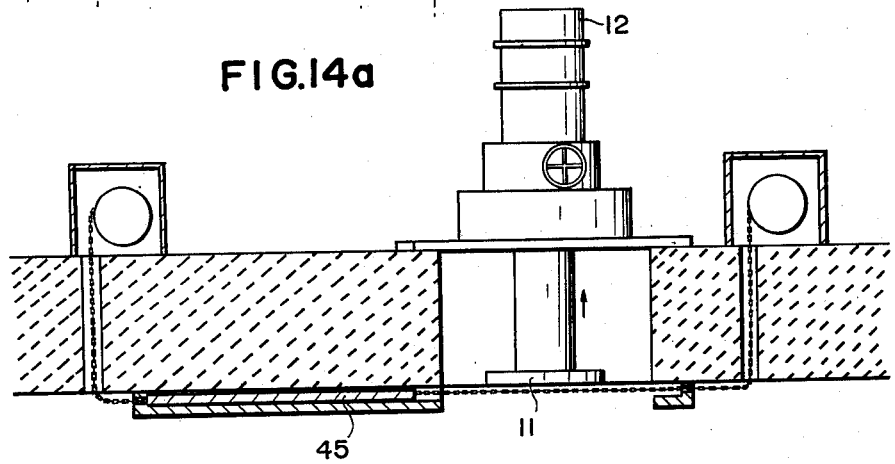
FIG. 14a is a front view illustrating a radiation thermometer-fixing means as in use with furnace walls in section.

FIG. 14a shows the mechanism in a normally operative position and FIG. 14b in a removed position. When removed, the shielding flange is moved in an upward direction into the casing. Then, the casing is protected from the furnace atmosphere by means of a damper 45 which is provided below and along a furnace wall (cross-hatching). Then the atmospheric gas of the casing may be exchanged with inert gas if necessary. Thereafter, the casing, which is hinged to the furnace wall is raised as shown in FIG. 14b so that the shielding flange 11 might be exchanged with a new one. The provision of the attaching and detaching mechanism is particularly advantageous in maintenance service of the shielding means.

In generally, provision of a temperature-measuring apparatus on the furnace means gives rise to various problems during fabricating the furnace body. However, when the temperature measuring apparatus is provided in the throat portion of a continuous annealing furnace in a manner as will be described hereinlater with reference to FIGS. 15a and 15b, the apparatus will be simplified to a significant degree and the replacement, repair and maintenance of the apparatus will become easy.

In FIG. 15a the temperature-measuring unit B is fixedly mounted on the throat portion of the continuous annealing furnace (connecting ends of which are shown in terms of A and C). That is, the temperature-measuring unit B shown in greater details in FIG. 15c is mounted between the furnace portions A and C of FIG. 15b.

The radiation thermometer useful in the present invention may be any commercially available thermometer but perferably it should include the following improvements to ensure a temperature measurement with higher accuracy than in a non-improved commercial radiation thermometer.

That is, the radiation thermometer is mounted with a device which allows an emissivity correction at a remote place. In a continuous annealing furnace, various kinds of steel plates are treated at different temperatures. As a result, the emissivity will be varied in a wide range. Accordingly, a reading of the radiation thermometer should be easily corrected with regard to an emissivity, depending upon the kind of steel under measurement to avoid unnecessary measuring errors. Additionally, the correction of the emissivity is preferred to be conducted in an operation control room. The radiation thermometer of the present invention has a mechanism which allows automatically emissivity corrections for a variety of steels by pushing a button for the respective kind of steel in the control room. Furthermore, the correction mechanism may be completely automated as will be described hereinlater. That is, the kind of a steel plate is automatically detected before the steel plate enters an annealing furnace. Then, the time required for the entered steel to reach the measuring point is precalculated automatically. Thus, it is possible to automatically correct the emissivity of the radiation thermometer as soon as the thermometer reaches the measuring point. In this connection, a steel plate to be treated has pores in a coded combination to give information concerning the kind of steel.

When a continuous annealing furnace having a direct flame heating system is used, a surface of a steel plate is locally contaminated by direct flames in a heating zone to produce irregularities in the emissivity of the steel plate. That is, the contaminated portions of the steel plate produce irregularities in the emissivity and therefore the indication of the radiation thermometer is disturbed as shown in FIG. 16a. The disturbance can be avoided by providing an electric compensation circuit for constantly maintaining a valley or average value of the thermometer readings to obtain a precise and accurate reading. Curves of the thermometer readings obtained before and after compensation are shown in FIG. 16b by broken and solid lines respectively.

The electric compensation circuit is constituted, for example, as shown in a block diagram in FIG. 16c. FIG. 16c shows waveforms of signals at different stages of the circuit.

An input voltage $V_i$ (having a maximum voltage $V_{max}$) is inverted by means of an inverting circuit and enters a comparison circuit through a switch circuit. When the voltage at the node 102 commences to drop, a signal of $\Delta V < O$ is emitted from the comparison circuit to the switch circuit, thereby to open the switch circuit. Meanwhile, the voltage at the node 103 which has been charged in the capacitor C begins to be discharged due to a potential difference between the charged voltage and $V_{max}$ at a time constant of CR. As a result, the discharged potential is inverted and appears at the output terminal 104. Meanwhile, when the potential at 102 is dismissed and the potential at 103 becomes higher than the discharged potential, the comparison circuit gives a signal of $\Delta V > O$ to close the switch circuit. As a result, the potential at 102 appears at 104 in an inverted form. The above-mentioned electric circuit is a vallay & peak circuit. An example of the vallay & peak circuit useful in the present invention is shown in FIG. 16d.

In accordance with the present invention, back radiation noises which cause measuring errors can be suitably eliminated by determining a back radiation rate $\eta$ by suitably setting a shielding mechanism to hold the radiation thermometer indication value within a tolerable error range under any varying operation conditions. Moreover, though it is generally difficult to maintain measuring conditions constant, the temperature measurement can be conducted in a satisfactory manner by suitably setting or resetting the shielding mechanism even when the furnace or steel plate temperature is in varying conditions.

As described hereinbefore, in the present invention, an accurate temperature of a steel plate is first measured by means of a contact-type thermometer and the correction or calibration of a radiation thermometer is carried out on the basis of the accurate temperature. Thereafter, a temperature of a steel plate is measured with the use of the radiation thermometer.

The present invention will be particularly illustrated in the following measuring experiment for suitably setting a shielding mechanism and for calibrating an emissivity of a radiation thermometer.

FIG. 16d is an example of the circuit shown in FIG. 16c and has the same function thereto.

Figure 17:
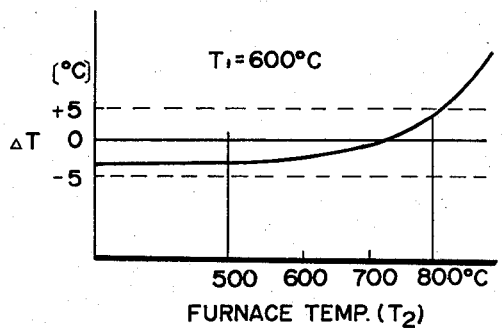
FIG. 17 is a graphical representation of a furnace temperature in relation with a measured temperature error.

FIG. 17 is a curve showing a relation between a furnace temperature and a measured temperature error $\Delta T$. As will be apparent from FIG. 17 showing a case where the steel plate temperature $T_1$ is 600°C, the value of a reading of the radiation thermometer is hardly affected even when a furnace temperature $T_2$ is changed from 500° to 800°C.

Figure 18:
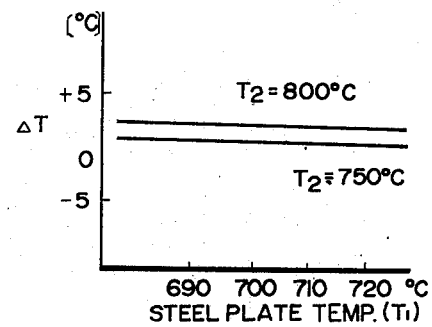
FIG. 18 is a graphical representation of temperatures of a heated material in relation with a measured temperature error.

FIG. 18 shows the relation between a temperature error $\Delta T$ and a steel plate (heated material) temperature $T_1$. This reveals that the variations in the furnace temperature $T_2$ result in corresponding variations in the temperature error $\Delta T$.

Figure 19:
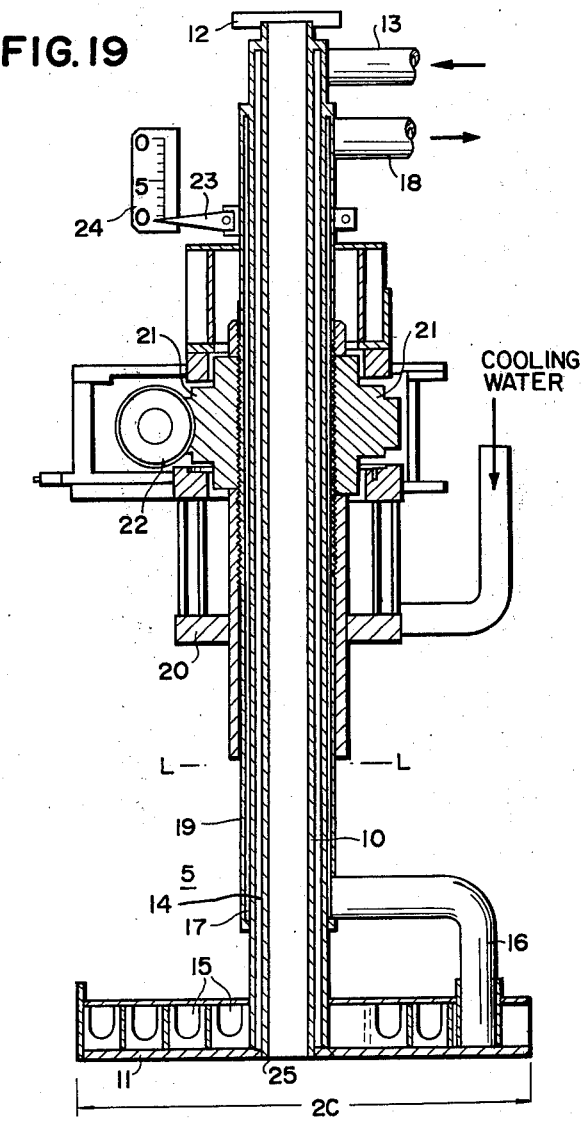
FIG. 19 is a sectional view showing a shielding means.

FIG. 19 more particularly shows the shielding mechanism 5 for mounting the radiation thermometer, which comprises an open ended tube 10 and a shielding flange 11 (of diameter 2C) having a tubular body mounted in the lower open end of the tube 10. At the top or rear end portion 12 of the tube 10 there is provided a radiation thermometer. A steel plate can be seen through the open end 25 of the tube 10. The tube 10 and the shielding flange 11 are cooled with water which enters from a tube 13 through an inner vertical water passage 14 on the circumference of the tube 10 to the shielding flange 11. Furthermore, the water is passed through a coil tube 15 and a tube 16 and an outer water passage on the circumference of the tube 10 and discharged through an outlet 18. A cylinder 19 which defines the outer water passage 17 is slidably supported by a supporting means 20.

The outer end portion of the cylinder 19 is threaded for engagement with a screw 21 which has external threads for engagement with a worm gear 22. Accordingly, when the worm gear 22 is turned by means of a handle (not shown), the rotation of the screw 21 is translated into an upward or downward movement of the cylinder 19. The cylinder 19 is integrally connected with the tube 10 and the shielding flange 11, so that it is possible to move up and down the shielding flange 11 and the radiation thermometer as desired by rotating the worm gear 22. The amount of displacement can be read out from the position of a pointer 23 on a dial 24. The portions of the shielding mechanism below the line L—L of FIG. 19 are inserted into the furnace.

It will be appreciated from the foregoing description that the shielding mechanism 5 can be advantageously employed as an adjusting means in putting into practice the present invention.

What is claimed is:

1. A method for measuring a heated material in an industrial furnace by the use of a radiation thermometer comprising the steps of positioning a shielding means at the tip portion of the radiation thermometer; moving the shielding means to thereby change the distance between the heated material and the shielding means to determine a background radiation rate of an energy reflected from the furnace atmosphere as determined by the combination of an output energy of the radiation thermometer, an accurate temperature of the heated material, and an ambient temperature of the furnace; calculating a temperature error at arbitrary distances on the basis of said background radiation rate; setting the shielding means of the radiation thermometer in a position at which the temperature error is within a tolerable range; and measuring the heated material with use of the radiation thermometer.

2. A method according to claim 1, wherein the ratio of the radius of the shielding means to the distance between the heated material and the shielding means is within a range of 0.05 to 5.

3. A method according to claim 1, wherein the temperature of the heated material is measured by means of the radiation thermometer by contacting a thin metal plate with one surface of the heated material, a surface of said metal plate being oxidized to impart thereto higher and stable emissivity.

4. An apparatus for measuring a heated material in an industrial furnace comprising an open ended tube adapted to protrude into the furnace through a furnace wall means for varying the length of protrusion of said open tube, said open tube having at its rear end a radiation thermometer and at its tip end a shielding means in face-to-face relation to the heated material, a contact-type thermometer movable for accurately measuring the heated material in the vicinity of a temperature measuring point of the radiation thermometer, and a furnace element throat portion which is removably mounted between two separate zones of the furnace, the throat portion mounting thereon an integrally assembled temperature-measuring mechanism comprising a shielding means for mounting a radiation thermometer, rollers for supporting the heated material, and a contact-type calibration thermometer.

5. An apparatus according to claim 4, wherein said shielding means comprises a stainless steel shielding flange having a surface which has a radiation rate greater than 0.9.

6. An apparatus according to claim 4, wherein said shielding means comprises a shielding flange, an open ended tube, a cylinder and a filter unit mounted on said cylinder, said shielding means being movable up and down and fixedly attached to said radiation thermometer.

7. An apparatus according to claim 4, wherein said shielding means further comprises a shielding flange removable into and out of the furnace, a casing for receiving the shielding flange, and a damper for closing out a furnace atmosphere.

8. An apparatus according to claim 4, further comprising a support structure for the contact-type thermometer comprising a cylinder slidably attached to a temperature detecting element of the thermometer and a means for moving said cylinder up and down.

9. An apparatus according to claim 4 and further comprising a means for automatically detecting the kind of a heated material under measurement and for automatically calibrating an emissivity of the radiation thermometer depending upon the kind of the heated material.

10. An apparatus according to claim 4, further comprising a calibrating electric circuit which generates a correct output signal by averaging valley values of output signals of the radiation thermometer, when the surface of a material to be measured is locally contaminated to increase the emissivity of the material.

11. An apparatus according to claim 4, further comprising a contacting sheet which is formed from a thin metal plate having a high emissivity, a cylindrical insulating material for supporting said contacting sheet, and a supporting cylinder having at one end thereof said insulating material and at the other end the radiation thermometer in such a manner that the focus point of the thermometer is located on the contacting sheet.

12. An apparatus for measuring a heated material in an industrial furnace, comprising:
   a. an open ended tube protruding into said furnace through a furnace wall, said open ended tube having at its rear end a radiation thermometer and at its front end a shielding means in face-to-face relation to the heated material;
   b. means for varying the distance between the shielding means and the heated material;
   c. a contact-type thermometer movable between a first position at which it contacts the heated material in the furnace and a second position displaced from the heated material in the furnace, said contact-type thermometer measuring a temperature of the heated material in the vicinity thereof including the point which is measured by the radiation thermometer;
   d. means for moving the contact-type thermometer from the second position to the first position and from the first position to the second position; and
   e. a furnace element throat portion which is removably mounted between two separate zones of the furnace, the throat portion mounting thereon an integrally assembled temperature-measuring mechanism comprising:
      1. a shielding means for mounting a radiation thermometer;
      2. rolls for supporting the heated material; and
      3. a contact-type calibration thermometer.

13. An apparatus according to claim 12, wherein said shielding means comprises a stainless steel shielding flange having a surface which has an emissivity greater than 0.9.

14. An apparatus according to claim 12, further comprising a casing for receiving the shielding means and a damper for intercepting a furnace atmosphere.

15. An apparatus according to claim 12, wherein the contact-type thermometer is constructed of a thin metal plate, which is heat insulated by a holder and forced by a spring means to contact the heated material and is connected to a temperature sensing means.

16. An apparatus according to claim 12, wherein the contact-type thermometer is constructed of a thin metal plate, which is heat insulated by a cylindrical holder and forced by a spring means to touch the heated material, and wherein a radiation detector detects the radiation of the rear surface of said plate through said holder.

* * * * *